US010782250B2

(12) United States Patent
Shin

(10) Patent No.: US 10,782,250 B2
(45) Date of Patent: Sep. 22, 2020

(54) HYBRID INSPECTION SYSTEM AND INSPECTION METHOD FOR DOSAGE

(71) Applicant: Yong-Kwan Shin, Seoul (KR)

(72) Inventor: Yong-Kwan Shin, Seoul (KR)

( * ) Notice: Subject to any disclaimer, the term of this patent is extended or adjusted under 35 U.S.C. 154(b) by 359 days.

(21) Appl. No.: 15/489,297

(22) Filed: Apr. 17, 2017

(65) Prior Publication Data

US 2017/0219497 A1    Aug. 3, 2017

Related U.S. Application Data

(63) Continuation of application No. PCT/KR2015/010915, filed on Oct. 15, 2015.

(30) Foreign Application Priority Data

Oct. 17, 2014 (KR) .................. 10-2014-0141020
Oct. 17, 2014 (KR) .................. 10-2014-0141022
Oct. 17, 2014 (KR) .................. 10-2014-0141027

(51) Int. Cl.
    *G01N 21/95*    (2006.01)
    *G06K 9/20*     (2006.01)
    (Continued)

(52) U.S. Cl.
    CPC ..... *G01N 21/9508* (2013.01); *G01N 21/8806* (2013.01); *G01N 21/9009* (2013.01);
    (Continued)

(58) Field of Classification Search
    CPC .......... G01N 21/9508; G01N 21/8806; G01N 21/9009; H04N 13/257; H04N 13/254; H04N 13/243
    (Continued)

(56) References Cited

U.S. PATENT DOCUMENTS 6,108,030 A * 8/2000 Yamamoto ......... G01N 21/9508
                                                      348/91
9,008,408 B2    4/2015 Sinbar et al.
(Continued)

FOREIGN PATENT DOCUMENTS

JP         05033006    *  4/1993
JP         08233744       9/1996
(Continued)

OTHER PUBLICATIONS

International Search Report in corresponding WIPO application PCT/KR2015/010915, dated Feb. 19, 2016.

*Primary Examiner* — Sath V Perungavoor
*Assistant Examiner* — Kristin Dobbs
(74) *Attorney, Agent, or Firm* — Ryan Alley IP

(57) ABSTRACT

A dosage hybrid inspection system includes a plurality of cameras selectively installed in sides of a rotating plate and a counter-rotating plate configured to vacuum suction a dosage along a circumference thereof. The cameras include a first camera unit including one or more camera arranged in the side of the rotating plate to photograph a top surface of a tablet when a bottom surface of the tablet is suctioned to the rotating plate, a second camera unit including a plurality of cameras arranged in the side of the rotating plate to photograph a portion of a circumferential surface of the tablet when the bottom surface of the tablet is suctioned to the rotating plate, a third camera unit including one or more camera arranged in the side of the counter-rotating plate to photograph the bottom surface of the tablet when the top surface of the tablet is suctioned to the counter-rotating plate, a fourth camera unit including a plurality of cameras arranged in the side of the counter-rotating plate to photograph another portion of the circumferential surface of the tablet when the top surface of the tablet is suctioned to the counter-rotating plate, wherein one or more camera of the (Continued)

second and fourth camera units is configured to photograph both edges of a capsule when a side surface of the capsule is suctioned to the rotating plate, and one or more camera of the first and third camera units is configured to photograph a circumferential surface of the capsule, and fifth and sixth camera units including a plurality of cameras further provided in the sides of the rotating plate and the counter-rotating plate to photograph another portion of the circumferential surface of the capsule which has not been photographed by the first and third camera units.

12 Claims, 10 Drawing Sheets

(51) Int. Cl.
| | |
|---|---|
| *H04N 13/257* | (2018.01) |
| *H04N 13/254* | (2018.01) |
| *H04N 13/243* | (2018.01) |
| *G01N 21/88* | (2006.01) |
| *G01N 21/90* | (2006.01) |
| *G06K 9/62* | (2006.01) |

(52) U.S. Cl.
CPC .......... *G06K 9/209* (2013.01); *G06K 9/6202* (2013.01); *H04N 13/243* (2018.05); *H04N 13/254* (2018.05); *H04N 13/257* (2018.05); *G01N 2021/8841* (2013.01); *H04N 2213/001* (2013.01)

(58) Field of Classification Search
USPC .......................................................... 348/48
See application file for complete search history.

(56) References Cited

U.S. PATENT DOCUMENTS

| | | | | |
|---|---|---|---|---|
| 2012/0096807 | A1* | 4/2012 | Okuma | .................... B65B 9/08 53/111 R |
| 2012/0290129 | A1* | 11/2012 | Luciano, Jr. | ........... B65D 75/42 700/244 |

FOREIGN PATENT DOCUMENTS

| | | |
|---|---|---|
| JP | 11248635 | 9/1999 |
| KR | 10-2011-012177 | 11/2011 |
| KR | 10-2012-0018632 | 3/2012 |
| KR | 10-1218764 | 1/2013 |
| KR | 101218764 B1 * | 1/2013 |
| KR | 10-2014-0044700 | 4/2014 |

* cited by examiner

HYBRID INSPECTION SYSTEM AND INSPECTION METHOD FOR DOSAGE

PRIORITY STATEMENT

This application claims priority under 35 U.S.C. § 119 to Korean Patent Application Nos. 10-2014-0141020, 10-2014-0141022 and 10-2014-0141027, filed on Oct. 17, 2014, Oct. 17, 2014, and Oct. 17, 2014, respectively in the Korean Intellectual Property Office (KIPO), the contents of which are herein incorporated by reference in their entirety.

BACKGROUND

1. Field

Example embodiments relate to a dosage hybrid inspection system including a rotating plate and a counter-rotating plate configured to vacuum suction a dosage along a circumference thereof, a first camera unit including one or more camera arranged in a side of the rotating plate to photograph a top surface of a tablet when a bottom surface of the tablet is suctioned to the rotating plate, a second camera unit including a plurality of cameras arranged in the side of the rotating plate to photograph a portion of a circumferential surface of the tablet when the bottom surface of the tablet is suctioned to the rotating plate, a third camera unit including one or more camera arranged in a side of the counter-rotating plate to photograph the bottom surface of the tablet when the top surface of the tablet is suctioned to the counter-rotating plate, a fourth camera unit including a plurality of cameras arranged in the side of the counter-rotating plate to photograph another portion of the circumferential surface of the tablet when the top surface of the tablet is suctioned on the counter-rotating plate, wherein one or more camera of the second and fourth camera units is configured to photograph both edges of a capsule when a side surface of the capsule is suctioned on the rotating plate, and one or more camera of the first and third camera units is configured to photograph a circumferential surface of the capsule, and fifth and sixth camera units including a plurality of cameras further provided in the sides of the rotating plate and the counter-rotating plate to photograph another portion of the circumferential surface of the capsule which has not been photographed by the first and third camera units.

Example embodiments relate to a dosage hybrid inspection method including storing data of a good dosage including a plurality of first projection views and second projection views connected to the first projection views of a good tablet or a good capsule, arranging two or more cameras along a circumference of a tablet or a capsule suctioned to a rotating plate or a counter-rotating plate, to photograph each first projection views or each second projection views that are represented as a front face view or a side view of the tablet or the capsule during one revolution thereof, and comparing data of the first projection views and the second projection views with the stored data of the good dosage, to determine whether the tablet or the capsule is defective or not.

2. Description of the Related Art

Generally, a dosage such as a tablet, a capsule, or the like may be visual inspected by an inspection apparatus, and then finally shipped.

For example, a size, shape, thickness, length and width, crack, recess, dent, foreign material adsorption, spot, capsule joining defect, surface defect, edge defect, coating failure, printing failure, etc, of a tablet manufactured in a manufacturing line may be inspected.

A conventional inspection apparatus uses a camera to photograph a tablet to obtain an image of a tablet surface, analyze and determined whether it is defective or not.

The conventional tablet inspection apparatus may include a tablet supply portion having a hopper, a plurality of drums configured to transfer tablets, a plurality of cameras and lightings configured to photograph the tablet, and a controller configured to process the obtained image and determine a failure.

In order to precisely inspect an appearance of the tablet, images of a front surface, a rear surface and both side surfaces of the tablet may be required, and the drums and the cameras may be used to photographs each faces of the tablet.

In related arts, Korean Patent No. 1218764 discloses an automatic dosage inspection apparatus. As illustrated in FIG. 1, as a hopper 24 of a tablet supply portion 10a is filled with a moderate amount of tablets, underlying tablets are inserted into tablet receiving recesses 11a of an upper inspection drum 13 respectively and suctioned and held in the tablet receiving recesses 11a by a vacuum pressure acting through a vacuum hole.

In here, the tablets which are not seated stably in the tablet receiving recess 11a are aligned by a guide brush 25 just before leaving the hopper 24, one surface of each of the tablets in the upper inspection drum 13 are photographed by a lighting 16 and a first camera 15a, and after the one surface inspection is finished, the tablets on the upper inspection drum 13 are transferred to a lower inspection drum 14 adjacent to the upper inspection drum 13 in reversed states, respectively.

Then, another surface and both side surfaces of the tablet on the lower inspection drum 14 are photographed by a second camera 15b to a sixth camera 15f of a detection portion 17 in the left of the drum, and the detection portion 17 includes the total six cameras 15, a first camera 10a is installed in a side of the upper inspection drum 13 to inspect the one surface of the tablet, and the second to sixth cameras 15b to 15f are installed in a side of the lower inspection drum 14 to inspect another surface and both sides of the tablet.

That is, the uppermost second camera 15b in the side of the lower inspection drum 14 inspects another surface of the tablet, the middle third and fourth cameras 15c and 15d inspect both side surfaces of the tablet, and the lowermost fifth and sixth cameras 15e and 15f inspect another surface of the tablet.

However, in the inspection apparatus, when the tablet is misaligned it is determined that the tablet is defective, thereby deteriorating the accuracy of the inspection apparatus.

Additionally, in case of inspecting a capsule, a filling state within the capsule cannot be detected, the capsule and the tablet cannot be inspected together.

Further, because the lighting as a general light source generates a shadow, it is difficult to accurately photograph the dosage.

SUMMARY

Example embodiments provide a dosage hybrid inspection system and inspection method capable of accurately inspect a capsule and a tablet using one apparatus, accurately detecting a printed state, foreign material adsorption, crack, spot, etc of the tablet and the capsule, removing a shadow effect and obtaining an accurate focus despite long time usage.

According to example embodiments, a dosage hybrid inspection system includes a plurality of cameras selectively installed in sides of a rotating plate and a counter-rotating plate configured to vacuum suction a dosage along a circumference thereof. The cameras include a first camera unit including one or more camera arranged in the side of the rotating plate to photograph a top surface of a tablet when a bottom surface of the tablet is suctioned to the rotating plate, a second camera unit including a plurality of cameras arranged in the side of the rotating plate to photograph a portion of a circumferential surface of the tablet when the bottom surface of the tablet is suctioned to the rotating plate, a third camera unit including one or more camera arranged in the side of the counter-rotating plate to photograph the bottom surface of the tablet when the top surface of the tablet is suctioned to the counter-rotating plate, a fourth camera unit including a plurality of cameras arranged in the side of the counter-rotating plate to photograph another portion of the circumferential surface of the tablet when the top surface of the tablet is suctioned to the counter-rotating plate, wherein one or more camera of the second and fourth camera units is configured to photograph both edges of a capsule when a side surface of the capsule is suctioned to the rotating plate, and one or more camera of the first and third camera units is configured to photograph a circumferential surface of the capsule, and fifth and sixth camera units including a plurality of cameras further provided in the sides of the rotating plate and the counter-rotating plate to photograph another portion of the circumferential surface of the capsule which has not been photographed by the first and third camera units.

In example embodiments, the dosage hybrid inspection system may further include an empty-capsule inspection assembly including a light source at at least one of the side of the rotating plate and the side of the counter-rotating plate and a color camera in a position corresponding to the light source.

In example embodiments, a plurality of the cameras which photograph the top surface and the bottom surface of the tablet, the edges of the capsule, the outer circumferential surface of the tablet, or the circumferential surface of the capsule may be installed integrally as a camera module in the rotating plate and the counter-rotating plate respectively, and the camera module may be installed to be rotatable relatively to a main body.

In example embodiments, the camera module may further include light sources which are arranged to be spaced apart from each other along a circumferential direction of the rotating plate or the counter-rotating plate at relatively higher and lower positions with respect to a position corresponding to the tablet or the capsule suctioned on the rotating plate or the counter-rotating plate.

In example embodiments, the first and third camera units photographing the top surface and the bottom surface of the tablet may further include a 3D camera respectively.

In example embodiments, the camera module may further include a nozzle and a surveillance camera to spray high pressure air to a foreign material adsorbed on a window.

In example embodiments, at least one of the rotating plate and the counter-rotating plate may be installed movably to adjust a distance between the rotating plate and the counter-rotating plate.

According to example embodiments, in a dosage inspection method, data of a good dosage including a plurality of first projection views and second projection views connected to the first projection views of a good tablet or a good capsule are stored in advance, two or more cameras are arranged along a circumference of a tablet or a capsule which is vacuum suctioned on a rotating plate or a counter-rotating plate, to photograph each first projection views that are represented as a face in a front view of the tablet or the capsule during one revolution thereof, one or more cameras is arranged to photograph each second projection views that are exposed when the tablet or the capsule is suctioned on the rotating plate or the counter-rotating plate, and data of the first projection views and the second projection views are compared with the stored data of the good dosage, to determine whether the tablet or the capsule is defective or not.

In example embodiments, when the second projection views are formed, color cameras may be arranged respectively to face the top surface/bottom surface of the tablet to detect a recess of the tablet.

In example embodiments, various error images occurring when the tablet is inaccurately suctioned on the rotating plate and the counter-rotating plate may be photographed and stored in advance, and compensation images corresponding to the error images may be generated, and when an actually captured image is an error image, the actually captured image may be compared with data of a good product using the compensation image.

In example embodiments, six first projection views may be formed from the circumference of the tablet or the capsule, and two second projection views may be formed from the top surface/bottom surface of the tablet or both edges of the capsule.

In example embodiments, the dosage inspection method may further include installing a color camera in a side of the counter-rotating plate and a light source corresponding to the color camera to detect whether the capsule is empty or not.

According to example embodiments, a capsule and a tablet can be accurately inspected using one apparatus, accurately detecting a printed state, a printed state, foreign material adsorption, crack, spot, etc of the tablet and the capsule can be accurately detected by one process, a shadow effect of a light source can be removed to prevent an inspection failure, and an accurate focus can be obtained despite long time usage.

BRIEF DESCRIPTION OF THE DRAWINGS

Example embodiments will be more clearly understood from the following detailed description taken in conjunction with the accompanying drawings.

FIG. 1 is a side view illustrating a conventional tablet inspection apparatus.

FIG. 2 is a front view illustrating an inspection system in accordance with example embodiments.

FIGS. 3 and 4 are views illustrating camera arrangements for inspecting a tablet and a capsule in an inspection system in accordance with example embodiments.

FIGS. 5 and 6 are views illustrating a camera module and a capsule inspection unit of an inspection system in accordance with example embodiments.

FIG. 7 is a block diagram illustrating control relationship of an inspection system in accordance with example embodiments.

FIGS. 8 and 9 are views illustrating a method of inspecting a tablet using an inspection system in accordance with example embodiments.

FIGS. 10 and 11 are views illustrating a method of inspecting a capsule using an inspection system in accordance with example embodiments.

DETAILED DESCRIPTION OF EXAMPLE EMBODIMENTS

Figure 1:
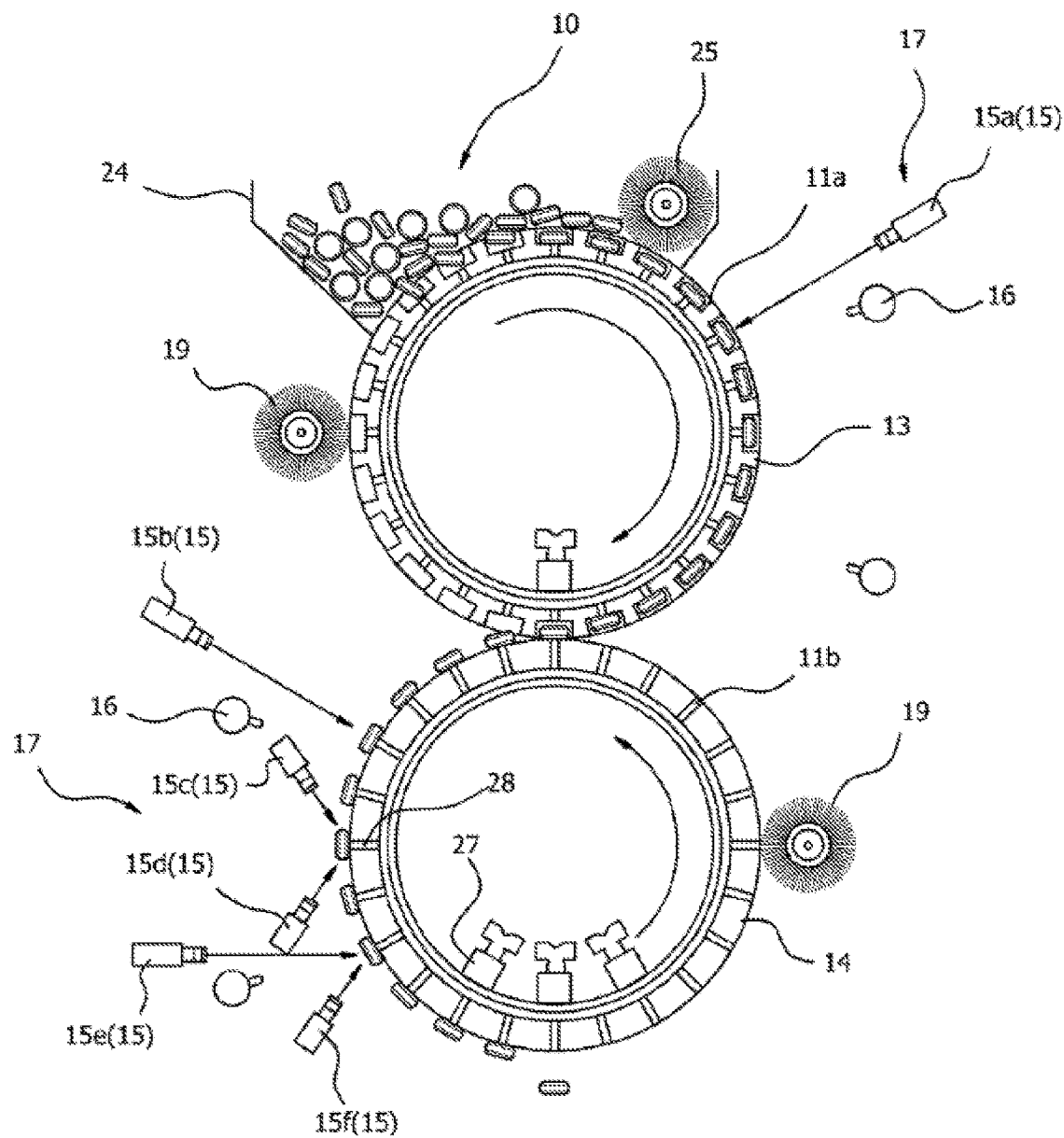
FIGS. 1 to 11 represent non-limiting, example embodiments as described herein.

Hereinafter, example embodiments will be explained in detail with reference to the accompanying drawings.

As illustrated in FIGS. 2 to 7, a hybrid inspection system includes a main body 100, a disk-shaped rotating plate 110 provided in the main body 100 and configured to vacuum suction a first side surface of a solidified dosage such as a capsule, a tablet or the like, and rotate about its own axis to move the dosage, a disk-shaped counter-rotating plate 130 configured to vacuum suction a second side surface of the dosage from the rotating plate 110 and rotate about its own axis to move the dosage in a reversed state, and a supply portion 150 configured to supply the dosages sequentially to the rotating plate 110.

The hybrid inspection system may further include a controller 500 in the main body 100. After the rotating plate 110 and the counter-rotating plate 130 are installed rotatably in the main body 100, a tablet T or a capsule C may be sequentially supplied to the rotating plate 110 through the supply portion 150 in response to control signals of the controller 500.

As illustrated in FIGS. 2, 3, 8 and 9, a first camera unit C1 including at least one camera 1, 2 may be arranged at a first side of the rotating plate 110 to capture an image of a top surface of the tablet T, with a bottom surface of the tablet T being suctioned on the rotating plate 110, and a second camera unit C2 including a plurality of cameras 3, 4, 5 may be arranged at the first side of the rotating plate 110 to capture an image of a first portion of an outer circumferential side surface of the tablet T with an angle range of at least 180 degrees with respect to a center line extending through the center of the tablet T vertically to the top surface/bottom surface of the tablet T.

In addition, a third camera unit C3 including at least one camera 6, 7 may be arranged at a first side of the counter-rotating plate 130 to capture an image of the bottom surface of the tablet T, with the top surface of the tablet T being suctioned on the counter-rotating plate 130, and a fourth camera unit C4 including a plurality of cameras 8, 9, 10 may be arranged at the first side of the counter-rotating plate 130 to capture an image of a second portion of the outer circumferential side surface of the tablet T with an angle range of at least 180 degrees with respect to the center line extending through the center of the tablet T.

As illustrated in FIGS. 2, 4, 9 and 10, one or more cameras 3, 5, 8, 10 of the second and fourth camera units C2, C4 may be configured to capture an image of each of both edges of the capsule C when a first side surface of the capsule C is suctioned to the rotating plate 110, and a plurality of the cameras 1, 6 of the first and third camera units C1 and C3 and additional fifth and sixth camera units C5, C6 may be configured to capture a portion of a circumferential surface of the capsule C including a cap 501 and a body 503.

That is, a plurality of the cameras 1, 6 of the first and third camera units C1 and C3, the fifth camera unit C5 including a plurality of cameras 11, 12, and the sixth camera unit C6 including a plurality of cameras 13, 14 may be provided at sides of the rotating plate 110 and the counter-rotating plate 130 respectively, to capture a first portion of the circumferential surface of the capsule C with an angle range of at least 180 degrees with respect to a center line extending through the center of the capsule C along a longitudinal direction thereof and a second portion of the circumferential surface of the capsule C with an angle range of at least 180 degrees with respect to the center line extending through the center of the capsule C along the longitudinal direction thereof, such that the circumferential surface of the capsule C including the cap and the body is photographed.

Figure 2:
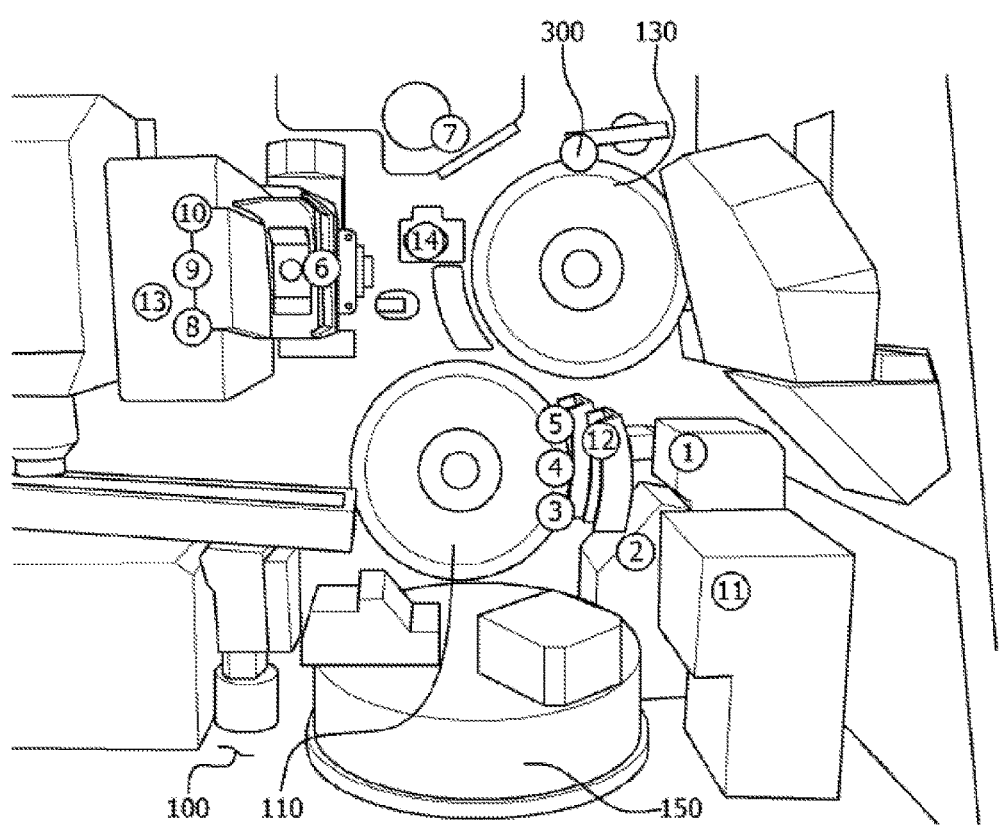
Figure 3:
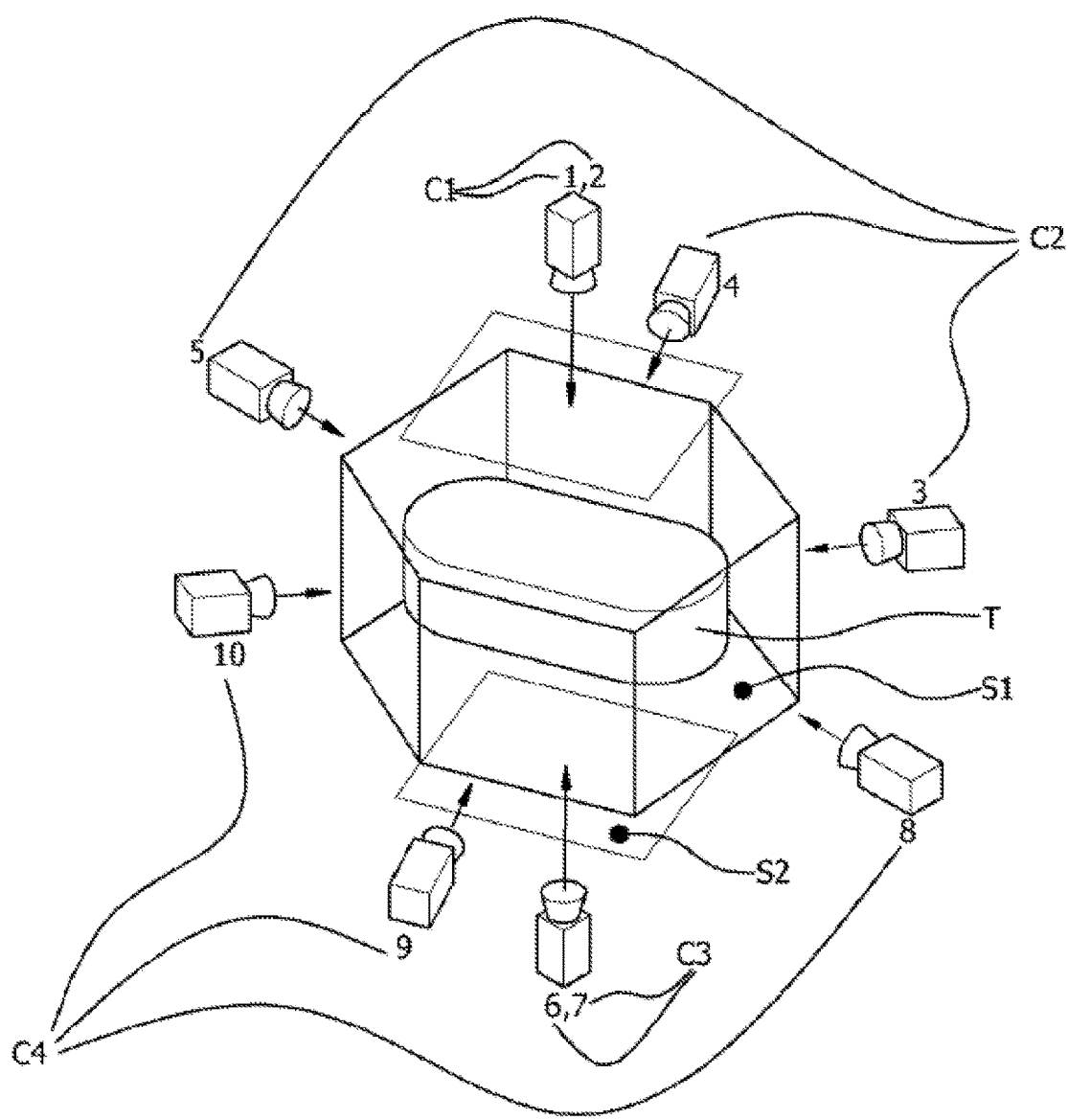
Figure 4:
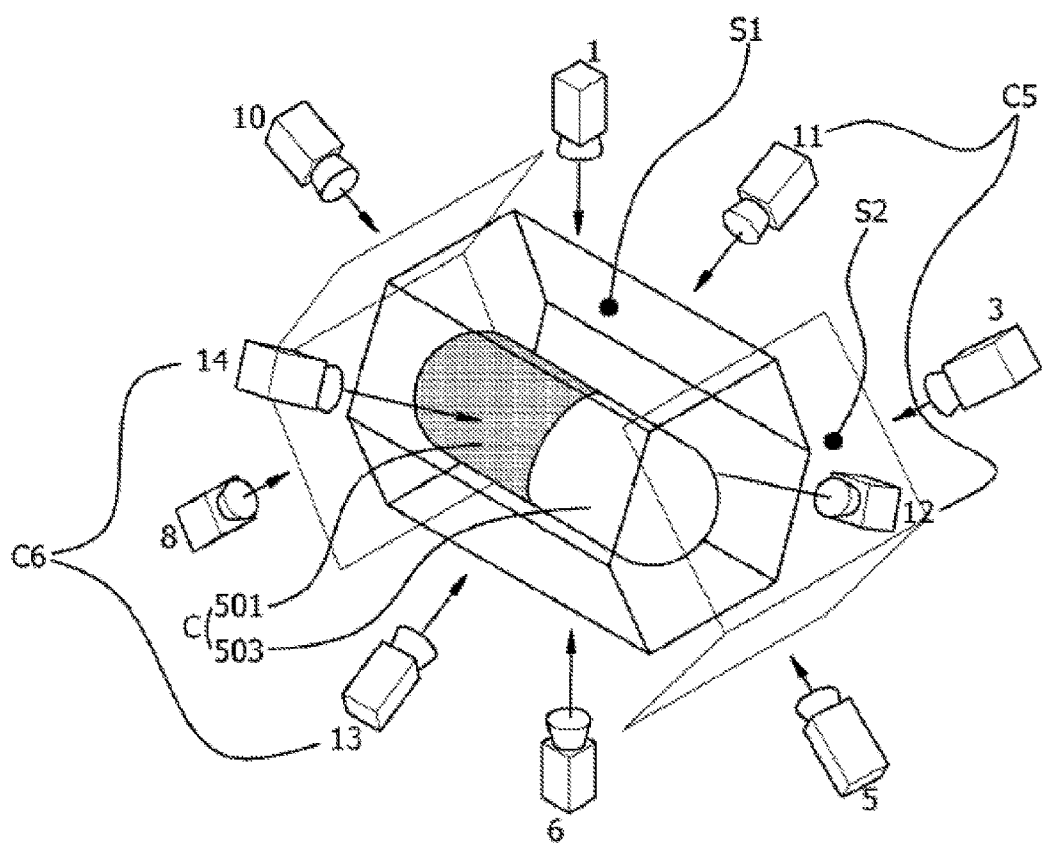

On the other hand, as illustrated in FIG. 2, an empty-capsule inspection assembly 300 may be further provided to include a light source 301 at at least one of the side of the rotating plate 110 and a side of the counter-rotating plate 130 and a color camera 303 in a position corresponding to the light source 301.

Figure 5:
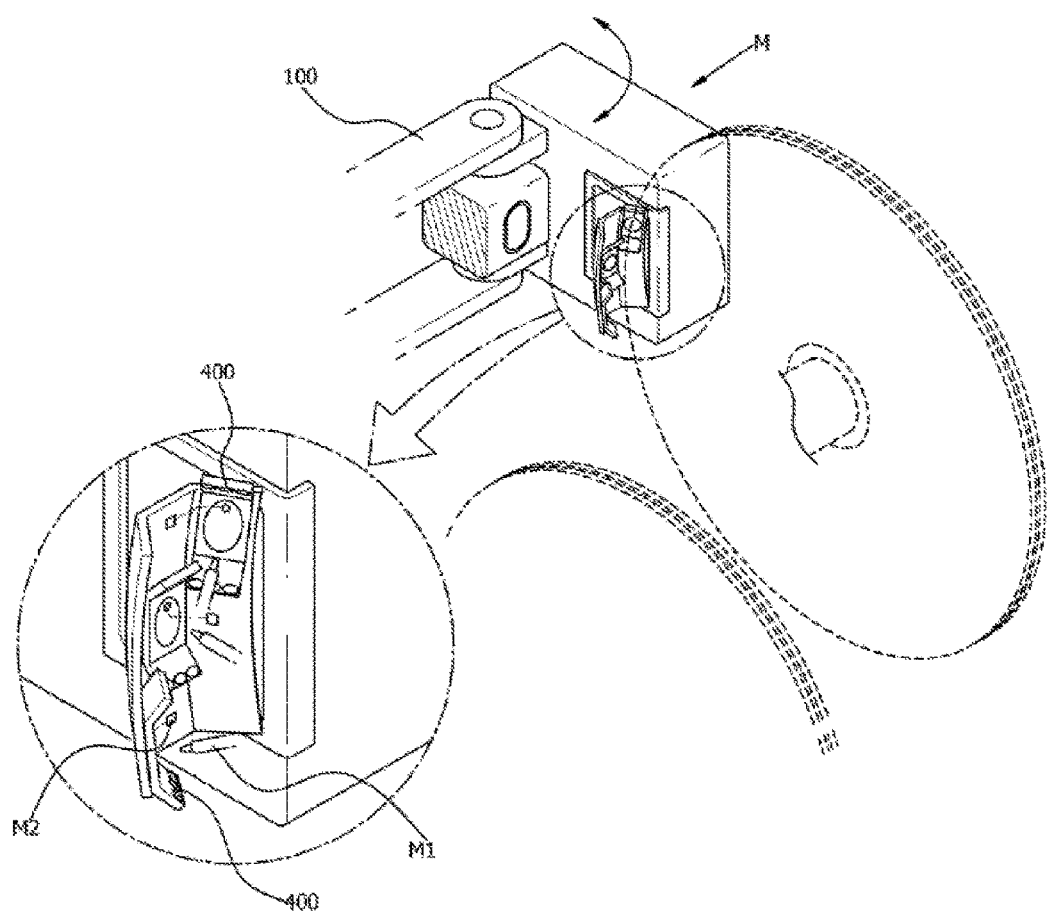
Figure 6:
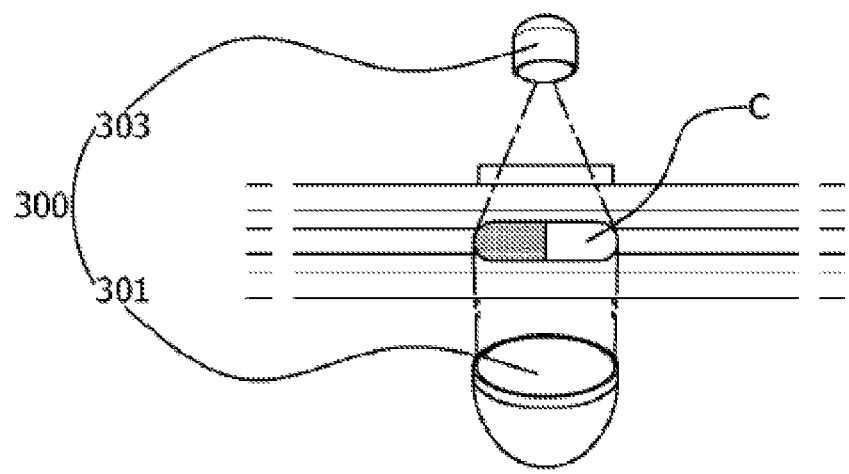
Figure 7:
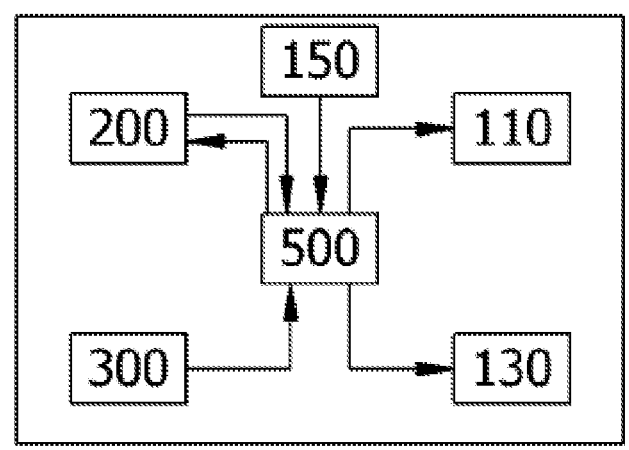
Figure 8:
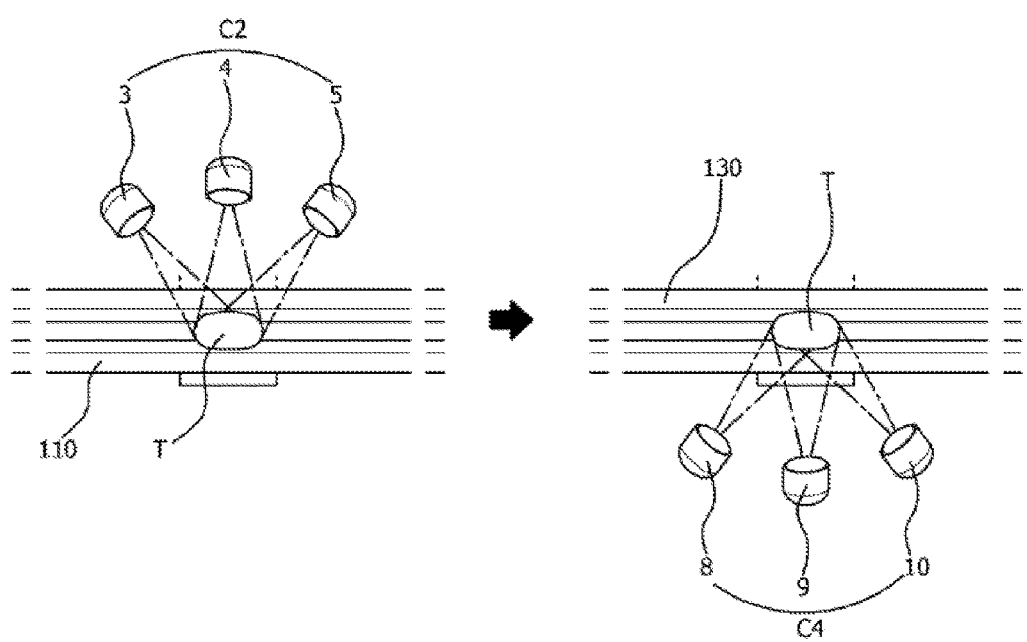
Figure 9:
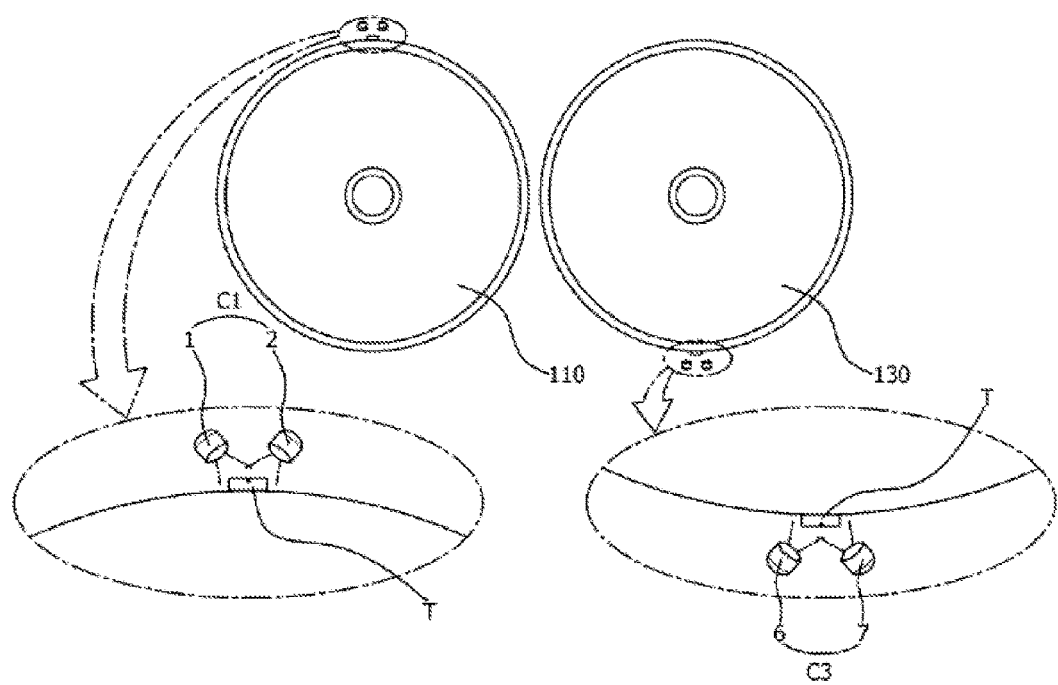

In addition, as illustrated in FIG. 5, a plurality of the cameras which are configured to capture images of the top surface/bottom surface of the tablet, the edges of the capsule, the outer circumferential surface of the tablet and the circumferential surface of the capsule may be installed integrally as a camera module M in the rotating plate and the counter-rotating plate respectively, and the camera module M may be installed rotatably in the main body 100.

Further, the camera module M may further include a plurality of light sources 400 which are arranged to be spaced apart from each other along a circumferential direction of the rotating plate or the counter-rotating plate at relatively higher and lower positions with respect to a position corresponding to the tablet or the capsule suctioned on the rotating plate or the counter-rotating plate.

The camera module M may be arranged to be inclined at a predetermined angle such that the center line of light from the light sources which are arranged above and under the camera, is aligned toward the tablet or the capsule. The light source may include an LED light source.

The first and third camera units C1, C3 may further include a 3D camera respectively.

Further, the camera module M may further include a nozzle M1 for cleaning a window and a surveillance camera M2 for monitoring a foreign material adsorbed on the window.

At least one of the rotating plate 110 and the counter-rotating plate 130 may be installed movably.

The controller 500 may perform programs which compare data of the tablet and the capsule actually captured by the cameras with stored data of a good product to determine whether the dosage is defective or not.

Hereinafter, operations of the hybrid inspection system will be explained.

As illustrated in FIGS. 2 to 7, the hybrid inspection system includes the rotating plate 110 configured to vacuum suction a first side surface of a solidified dosage such as a capsule, a tablet, etc, and rotate about its own axis to move the dosage, the counter-rotating plate 130 configured to vacuum suction a second side surface of the dosage from the rotating plate 110 and rotate about its own axis to move the dosage in a reversed state, and the supply portion 150 configured to supply the dosages sequentially to the rotating plate 110.

That is, when each of the dosages is supplied to the rotating plate 110 by the supply portion 150, the dosage is rotated with the first side surface of the dosage being vacuum suctioned, and then, when a vacuum pressure acting on the rotating plate 110 is removed or decreased, the dosage is transferred to the counter-rotating plate 130 which is installed adjacent to the rotating plate 110, with the second side surface of the dosage being suctioned on the counter-rotating plate 130 by a vacuum pressure, and then is rotated together with the rotation of the counter-rotating plate 130.

In this case, the first camera unit C1 including the at least one camera 1, 2 is arranged at a first side of the rotating plate 110 to capture an image of a top surface of a tablet T, with a bottom surface of the tablet T being suctioned on the rotating plate 110, and the second camera unit C2 including a plurality of the cameras 3, 4, 5 is arranged at the first side of the rotating plate 110 to capture an image of a first portion of an outer circumferential side surface of the tablet T with an angle range of at least 180 degrees with respect to the center line extending through the center of the tablet T vertically to the top surface/bottom surface of the tablet T.

After the photographing of the table T, of which the bottom surface is suctioned to the rotating plate 110, is completed, the tablet T is transferred to the counter-rotating plate 130. The third camera unit C3 including the at least one camera 6, 7 is arranged at a first side of the counter-rotating plate 130 to capture an image of the bottom surface of the tablet T, with the top surface of the tablet T being suctioned on the counter-rotating plate 130, and the fourth camera unit C4 including a plurality of the cameras 8, 9, 10 may be arranged at the first side of the counter-rotating plate 130 to capture an image of a second portion of the outer circumferential side surface of the tablet T with an angle range of at least 180 degrees with respect to the center line extending through the center of the tablet T.

Figure 10:
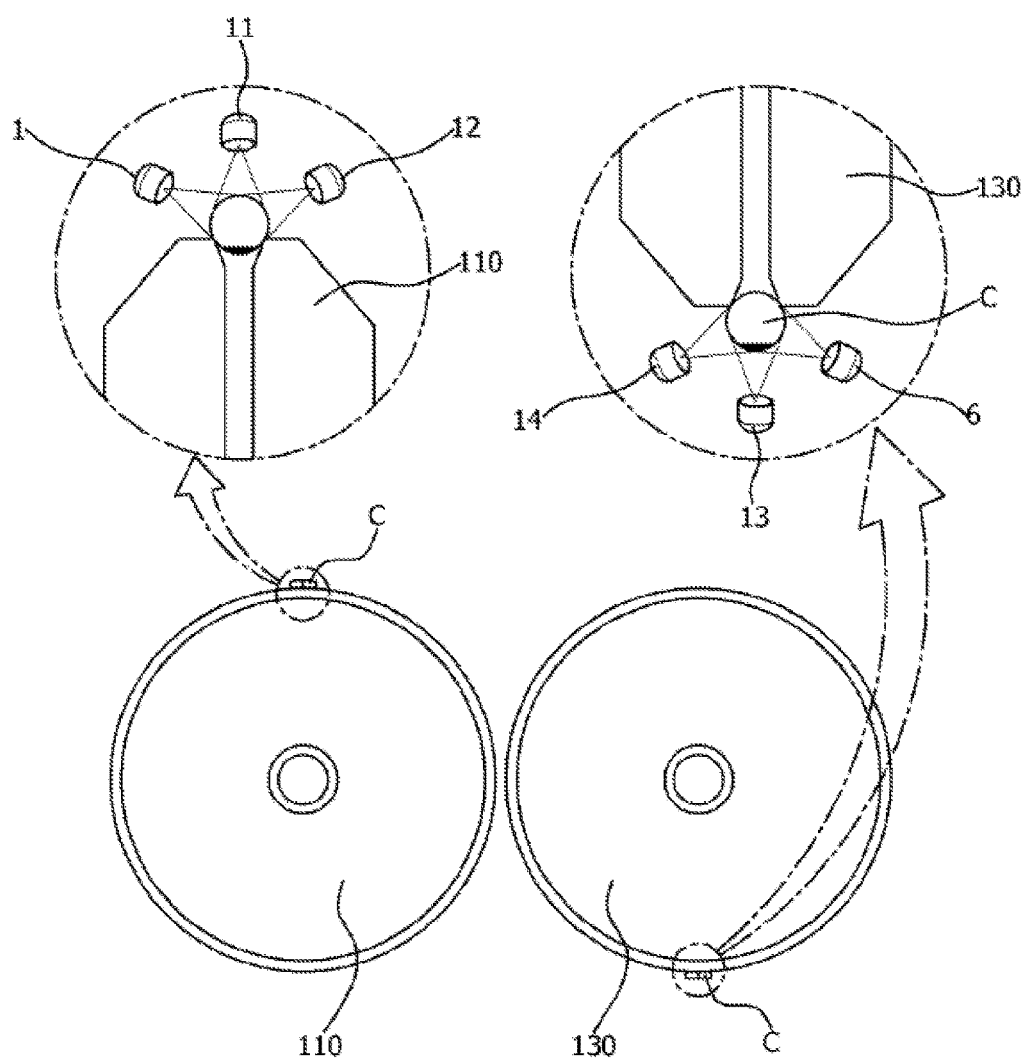
Figure 11:
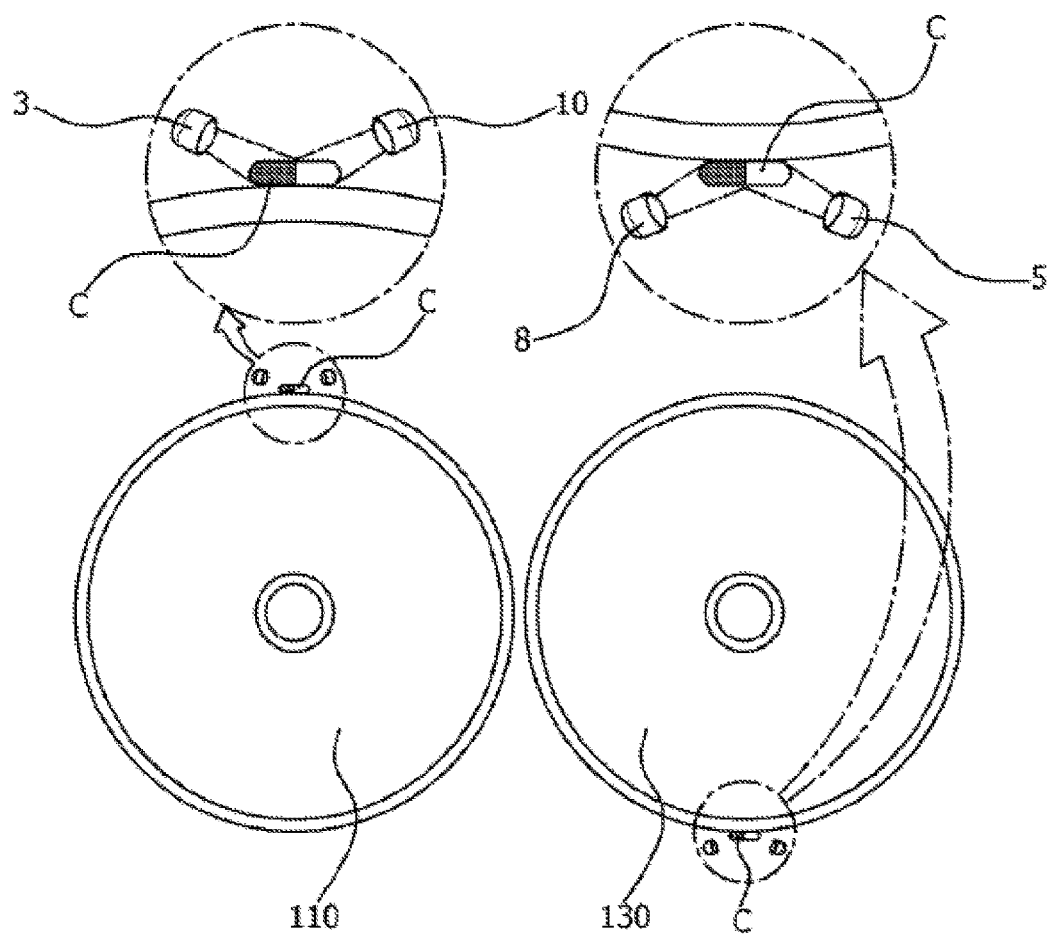

In example embodiments, the above cameras 1, 2, 3, 4, 5, 6, 7, 8, 9, 10 may be used to photograph the tablet T. Additionally, as illustrated in FIGS. 10 and 11, some cameras 1, 3, 5, 6, 8, 10 of the above cameras and additional minimum cameras 11, 12, 13, 14 may be used to photograph the capsule. Accordingly, a tablet and a capsule together may be photographed and inspected through the one equipment.

That is, in case of photographing the capsule, one or more cameras 3, 5, 8, 10 of the second and fourth camera units C2, C4 capture an image of each of both edges of a capsule C, with a first side surface of the capsule C being suctioned on the rotating plate 110, and a plurality of the cameras 1, 6 of the first and third camera units C1 and C3 and additional fifth and sixth camera units C5, C6 capture a circumferential surface of the capsule C.

In photographing the circumferential surface of the capsule, the fifth camera unit C5 including a plurality of the cameras 11, 12 and the sixth camera unit C6 including a plurality of the cameras 13, 14 may be further provided at the sides of the rotating plate 110 and the counter-rotating plate 130 respectively, to capture a first portion of the circumferential surface of the capsule C with an angle range of at least 180 degrees with respect to a center line extending through the center of the capsule C along a longitudinal direction thereof and a second portion of the circumferential surface of the capsule C with an angle range of at least 180 degrees with respect to the center line extending through the center of the capsule C along the longitudinal direction thereof.

On the other hand, the empty-capsule inspection assembly 300 including the light source 301 at the at least one of the side of the rotating plate 110 and the side the counter-rotating plate 130 and the color camera 303 in a position corresponding to the light source 301 may be further provided to determine whether the capsule is empty or not, based on an amount of light transmitting through the capsule while photographing the capsule.

In addition, a plurality of the cameras which are configured to capture images of the top surface/bottom surface of the tablet, the edges of the capsule, the outer circumferential surface of the tablet and the circumferential surface of the capsule may be installed integrally as a camera module M in the rotating plate and the counter-rotating plate respectively, and the camera module M may be installed rotatably in the main body 100 to thereby easily maintain the total cameras.

Further, a plurality of the light sources 400 may be further disposed in the camera module M, and because the light sources 40 are arranged to be spaced apart from each other along a circumferential direction of the rotating plate or the counter-rotating plate at a position corresponding to the tablet or the capsule suctioned on the rotating plate or the counter-rotating plate, a shadow effect may be minimized to thereby prevent a failure in photograph.

Further, at least one of the first and third camera units C1, C3 may further include a 3D camera or a color camera. Accordingly, a dent or protrusion, or a printed state in the surface of the tablet or the capsule and a crack or recess of the capsule or the tablet may be may be easily detected.

Further, the camera module M may further include the nozzle M1 for cleaning the window and the surveillance camera M2 for monitoring a foreign material adsorbed on the window. Accordingly, a periodic high pressure spraying may prevent a photograph failure due to dust.

Further, at least one of the rotating plate 110 and the counter-rotating plate 130 may be installed movably. Accordingly, the distance between the rotating plate and the counter-rotating plate may be easily adjusted according to the size of the capsule or the tablet.

Hereinafter, a method of inspecting a tablet using the system will be explained.

As illustrated in FIGS. 2, 3, 8 and 9, after the rotating plate 110 and the counter-rotating plate 130 are installed rotatably in the main body 100, tablets T are sequentially supplied to the rotating plate 110 through the supply portion 150 in response to control signals of the controller 500.

In here, a camera unit including a plurality of the cameras 1, 2, 3, 4, 5, 6, 7, 8, 9, 10 is selected to capture an image of each portion of the tablet.

The rotating plate, the counter-rotating plate, the camera unit and the supply portion may be connected to the controller 500, and the controller 500 may store in advance data of a good tablet T including a plurality of first projection views S1 which are captured from an outer circumferential side surface of a good tablet T and second projection views S2 which are captured from a top surface and a bottom surface of the good tablet T in a data storing portion 200.

When the tablets T are supplied to the rotating plate 110 through the supply portion 150, the tablets T are sequentially supplied along a circumference of the rotating plate 110, and then, are transferred and suctioned to the counter-rotating plate 130 adjacent to the rotating plate 110 in a reversed state thereof.

That is, when each of the tablets is supplied to the rotating plate 110 by the supply portion 150, the tablet is rotated with one side surface of the tablet being vacuum suctioned, and then, when a vacuum pressure acting on the rotating plate 110 is removed or decreased, the tablet is transferred to the counter-rotating plate 130 which is installed adjacent to the rotating plate 110, with another side surface of the tablet being suctioned on the counter-rotating plate 130 by a vacuum pressure, and then is rotated together with the rotation of the counter-rotating plate 130.

In this case, good data of a plurality of the first projection views S1 obtained along the outer circumferential side surface of a good tablet T and good data of second projection views S2 obtained from the top surface and the bottom surface of the good tablet T are stored in advance in the controller 500 provided in the main body 100.

Then, two or more cameras 3, 4, 5 are arranged along the circumference of the rotating plate 110 to photograph the tablet T when a bottom surface of the tablet is suctioned to the rotating plate 110, at different angles during one revolution to obtain each first projection views S1 which are represented as a face when projected in the front of the tablet T.

In here, the two or more cameras 3, 4, 5 arranged at the side of the rotating plate 110 may be arranged at spaced positions to have different angles with respect to the center line extending through the center of the tablet vertically to the top surface of the tablet, to photograph a first portion (for example, half portion) of the outer circumferential side surface of the tablet T which is viewed in a front of the rotating plate 110 (projected in the front view of the tablet T).

Additionally, one or more camera 1, 2 is arranged along a circumferential direction of the rotating plate 110 to photograph the top surface of the tablet T when a bottom surface of the tablet is vacuum suctioned on the circumference of the rotating plate 110.

In here, the camera 2 may include a 3D camera or a color camera to detect a crack or a bad printing in the surface of the tablet, and the cameras 1, 2 may obtain each the second projection views S2 which are represented as a face when projected in the front of the tablet.

Data of the first projection views and the second projection views of the tablet which are actually captured by the cameras 1, 2, 3, 4, 5 may be compared with the stored data of the good product in the controller 500 to determine whether the tablet is defective or not.

Then, after the photographing the first projection views S1 and the second projection views S2 of the tablet T when the bottom surface of the tablet T is suctioned to the rotating plate 110, is completed, the tablet T is transferred to the counter-rotating plate 130, and then, another portion of the tablet T which has not been yet photographed is photographed to capture first projection views S1 and second projection views thereof.

In particular, two or more cameras 8, 9, 10 are arranged along a circumference of the counter-rotating plate 130 to photograph the tablet T when the top surface (projection view S2) of the tablet is suctioned to the circumference of the counter-rotating plate 130, at different angles during one revolution to obtain each first projection views S1 which are represented as a face when projected in the front of the tablet T.

In here, the two or more cameras 8, 9, 10 arranged at the side of the counter-rotating plate 130 may be arranged at spaced positions to have different angles with respect to the center line extending through the center of the tablet vertically to the bottom surface of the tablet, to photograph a second portion (for example, another half portion) of the outer circumferential side surface of the tablet T which is viewed in a front of the counter-rotating plate 130 (projected in the front view of the tablet T).

Additionally, one or more camera 6, 7 is arranged along a circumferential direction of the counter-rotating plate 130 to photograph the bottom surface of the tablet T (that is, another second projection views S2) when the top surface of the tablet is vacuum suctioned on the circumference of the counter-rotating plate 130.

In here, the camera 7 may include a 3D camera or a color camera to detect a crack or a bad printing in the surface of the tablet, and the cameras 1, 2 may obtain each the second projection views S2 which are projected in the top view of the tablet.

Data of the first projection views and the second projection views of the tablet which are actually captured by the cameras 1, 2, 3, 4, 5, 6, 7, 8, 9, 10 may be compared with the stored data of the good product to determine whether the tablet is defective or not.

Additionally, the cameras 2, 7 including a 3D camera or a color camera are installed to face the circumferences of the rotating plate and the counter-rotating plate respectively, to detect a state of an engraved letter, or a flaw or crack, etc.

As mentioned above, six cameras 3, 4, 5, 8, 9, 10 may be selectively installed in the rotating plate or the counter-rotating plate along a circumference of the tablet T to photograph the outer circumferential side surface of the tablet T and obtain six first projection views S1, and four cameras 1, 2, 6, 7 may be selectively installed in the rotating plate or the counter-rotating plate to face the top surface or the bottom surface of the tablet T to photograph the top surface and the bottom surface of the tablet T and obtain two or more second projection views S2.

In here, the cameras 2, 7 may include a color camera, to detect a recess of the tablet T through the second projection view S2.

Additionally, the controller 500 may perform programs to compare data of the first projection view and the second projection view of the tablet T obtained by the camera units with stored data of a good product to determine whether the tablet is defective or not.

Further, when the tablet T is vacuum suctioned on the rotating plate 110 and the counter-rotating plate 130, the tablet T may be in an inaccurate position due to an inaccurate suction angle. In order to check whether the tablet T is suctioned accurately or not, the controller 500 may store data of error images corresponding to inaccurate suction angles of the tablet and output an error image corresponding to an image captured when the tablet is inaccurately suctioned on the rotating plate and the counter-rotating plate, to provide precise comparison results in spite of inaccurate captured image.

That is, various error images occurring when a tablet is suctioned inaccurately on the rotating plate and the counter-rotating plate may be photographed and stored in advance, compensation images corresponding to the error images may be generated, and even though an actually captured image is an error image, the actually captured image may be compared with data of a good product using the compensation image.

Hereinafter, a method of inspecting a capsule using the system will be explained.

As illustrated in FIGS. 2, 4, 10 and 11, after the rotating plate 110 and the counter-rotating plate 130 are installed rotatably in the main body 100, capsules C are sequentially supplied to the rotating plate 110 through the supply portion 150.

When each of the capsules is supplied to the rotating plate 110 by the supply portion 150, the capsule is rotated with one side surface of the capsule being vacuum suctioned on the rotating plate 110, and then, when a vacuum pressure acting on the rotating plate 110 is removed or decreased, the capsule is transferred to the counter-rotating plate 130 which is installed adjacent to the rotating plate 110, with another side surface of the capsule being suctioned on the counter-rotating plate 130 by a vacuum pressure, and then is rotated together with the rotation of the counter-rotating plate 130.

The capsule C may include a cap C1 and a body C2, which are same or different colors.

A camera unit including a plurality of the cameras and a light source 400 respectively corresponding to the cameras may be provided to capture an image of each portion of the capsule C with desired illumination intensity.

When the capsules C are supplied to the rotating plate 110 through the supply portion 150, the capsules C are sequentially supplied along a circumference of the rotating plate 110, and then, are transferred and suctioned to the counter-rotating plate 130 adjacent to the rotating plate 110 in a reversed state thereof, to perform an inspection process on the capsule.

In this case, good data of a plurality of the first projection views S1 obtained along the circumferential surface of a good capsule C and good data of second projection views S2 obtained from both edges of the good capsule C are stored in advance in the controller 500 provided in the main body 100.

Then, two or more cameras 1, 11, 12 are arranged along the circumference of the rotating plate 110 to photograph the capsule C when a first side surface of the capsule is suctioned to the rotating plate 110, at different angles during one revolution to obtain a plurality of first projection views S1 which are represented as a face and photographed along the circumferential surface of the capsule with respect to the center line extending through the center of the capsule along a longitudinal direction thereof.

Additionally, one or more camera 3, 10 arranged at the side of the rotating plate 110 may be arranged at spaced positions to have different angles along a circumferential direction of the rotating plate 110 to photograph longitudinal end portions, that is, both edges of the capsule C, to obtain second projection views S2 of the capsule C.

Data of the first projection views and the second projection views of the capsule suctioned on the rotating plate 110, which are actually captured by the cameras 1, 11, 12, 3, 10 may be compared with the data of the good product stored in the data storing portion 200 connected to the controller 500 to determine whether the tablet is defective or not.

In here, the controller 500 may perform programs which compare data of the first projection views and the second projection views of the capsule C actually captured by the camera unit with data stored in the data storing portion 200 to determine whether the dosage is defective or not.

Then, after the photographing the first projection views S1 and the second projection views S2 of the capsule C when the first side surface of the capsule is suctioned to the rotating plate 110, is completed, the capsule C is transferred to the counter-rotating plate 130, and then, another portion of the capsule C which has not been yet photographed is photographed to capture first projection views S1 and second projection views thereof.

In particular, two or more cameras 6, 13, 14 are arranged along the circumference of the counter-rotating plate 130 to photograph the capsule C when a second side surface of the capsule is suctioned to the counter-rotating plate 130, at different angles during one revolution to obtain a plurality of first projection views S1 which are viewed along the circumferential surface of the capsule with respect to the center line extending through the center of the capsule along the longitudinal direction thereof, that is, which are represented as a face when projected in the front of the capsule C.

Additionally, one or more camera 5, 8 arranged at the side of the counter-rotating plate 130 may be arranged at spaced positions to have different angles along a circumferential direction of the counter-rotating plate 130 to photograph longitudinal end portions, that is, both edges of the capsule C, to obtain second projection views S2 of the capsule C.

Data of the first projection views and the second projection views of the capsule suctioned on the counter-rotating plate 130, which are actually captured by the cameras 5, 6, 8, 13, 14 may be compared with the data of the stored good product to determine whether the tablet is defective or not.

The controller 500 may perform programs which compare data of the first projection views and the second projection views of the capsule C actually captured by the camera unit with data stored in the data storing portion 200 to determine whether the dosage is defective or not.

Additionally, the empty-capsule inspection assembly 300 including the light source 301 and the color camera 303 in a position corresponding to the light source 301 may be used to determine whether the capsule C is empty or not, based on an amount of light transmitting through the capsule while photographing the capsule.

Further, each of the cameras of the camera unit may include 3D camera or a color camera to detect a bad printing, or a flaw or crack, a recess, etc.

Further, when the capsule C includes the cap C1 and the body C2, three cameras of the total six cameras may be arranged along the circumferential surface of the capsule to capture equally divided three parts of the cap and other three cameras of the total six cameras may be arranged along the circumferential surface of the capsule to capture equally divided three parts of the body, to obtain first projection views at different angles with respect to the center line extending through the center of the capsule along the longitudinal direction thereof.

As mentioned above, six cameras 1, 6, 11, 12, 13, 14 may be selectively installed in the rotating plate or the counter-rotating plate along a circumference of the capsule C to photograph the circumferential surface of the capsule C and obtain six first projection views S1, and four cameras 3, 5, 8, 10 may be selectively installed in the rotating plate or the counter-rotating plate to photographs both edge portions of the capsule C and four second projection views S2.

INDUSTRICAL APPLICABILITY

According to example embodiments, one imaging and inspection apparatus may perform an inspection process on a tablet and a capsule, to thereby reduce inspection cost and accurately and rapidly inspect various types of dosages.

What is claimed is:
1. A dosage hybrid inspection system for inspecting a tablet or capsule suctioned onto one of a circumference of a disk-shaped rotating plate and a disk-shaped counter-rotating plate in a main body comprising:
   a first camera installed at a side of the rotating plate and oriented to record a top surface of the tablet when a bottom surface of the tablet is suctioned to the rotating plate;
   a second camera installed at the side of the rotating plate and oriented to record the top surface of the tablet when the bottom surface of the tablet is suctioned to the rotating plate;
   a third camera installed at a side of the counter-rotating plate and oriented to record the bottom surface of the tablet when the top surface of the tablet is suctioned to the counter-rotating plate;
   a fourth camera installed at the side of the counter-rotating plate and oriented to record the bottom surface of the tablet, with the top surface of the tablet being suctioned on the counter-rotating plate;
   a fifth camera installed at a side of the rotating plate and oriented to record a circumferential surface of the tablet or capsule, wherein the fifth camera is not in a plane of rotation of the rotating plate; and a sixth camera installed at a side of the counter-rotating plate and oriented to record a circumferential surface of the tablet or capsule, wherein the sixth camera is not in a plane of rotation of the counter-rotating plate.

2. The system of claim 1, wherein at least one of the fifth camera and the sixth camera are oriented to record ends of the tablet or capsule when the tablet or capsule is suctioned onto at least one of the rotating plate and the counter-rotating plate, at least one of the first camera and the third camera are oriented to record a portion of the circumferential surface of the tablet or capsule, and at least one of the rotating plate and the counter-rotating plate is movable to adjust a distance between the rotating plate and the counter-rotating plate.

3. The system of claim 1, further comprising:
an empty-capsule inspection assembly including,
   a light at one of the side of the rotating plate and/or the side of the counter-rotating plate, and
   a color camera oriented to record a position illuminated by the light.

4. The system of claim 1, further comprising:
a camera module including at least one of the first, second, third, fourth, fifth, and sixth cameras, wherein the camera module is installed integrally in one of the rotating plate and the counter-rotating plate and rotatable relative to the main body.

5. The system of claim 4, wherein the camera module further includes a light source oriented to illuminate the tablet or capsule in a higher position and a lower position, and wherein the first and third cameras include a 3D camera.

6. The system of claim 4, wherein the camera module further includes a surveillance camera and a nozzle configured to spray high pressure air on a foreign material adsorbed on a window.

7. A dosage inspection method using a hybrid inspection system having a disk-shaped rotating plate and a disk-shaped counter-rotating plate configured to suction and hold a dosage including a tablet or a capsule, the method comprising:

storing data of a good dosage including a plurality of views of a circumference, at least one of a top surface and a bottom surface perpendicular to the circumference, and edges of the good dosage in a data store;

recording, with a plurality of first cameras oriented along a circumference of the dosage suctioned onto at least one of the rotating plate and the counter-rotating plate, wherein the first cameras are not in a plane of rotation of the rotating plate or the counter-rotating plate, views of at least 180 degrees of a circumference of the dosage;

recording, with a plurality of second cameras oriented to face at least one of a top surface and a bottom surface of the tablet, and both edges of the dosage, views of at least one of the top surface and the bottom surface of the dosage perpendicular to the circumference; and comparing the views of the good dosage and the views of the dosage recorded by the first and the second cameras, to determine whether the dosage is defective.

8. The dosage inspection method of claim 7, wherein the first cameras include six cameras installed at least 180 degrees around the circumference of the dosage, and wherein views of the dosage recorded by the first and the second cameras are formed from the at least one of a top surface and a bottom surface of the dosage, and both ends of the dosage.

9. The dosage inspection method of claim 7, wherein the recording with the plurality of second cameras includes detecting, with a plurality of color cameras oriented to face at least one of the top surface, bottom surface of the dosage, and a recess of the dosage.

10. The dosage inspection method of claim 7, further comprising:

storing error images when the dosage is inaccurately suctioned onto at least one of the rotating plate and the counter-rotating plate, and generating compensation images corresponding to the error images, wherein the comparing includes comparing an actually-captured image with data of the good dosage using the compensation image when the actually-captured image is one of the error images.

11. The dosage inspection method of claim 7, further comprising:

detecting, with a color camera installed at a side of the counter-rotating plate and a light, whether the capsule is empty.

12. The system of claim 1, further comprising:

a seventh camera and an eighth camera installed at the side of the rotating plate with the fifth camera and oriented to record at least 180 degrees of the circumferential surface of the dosage; and a ninth and a tenth camera installed at the side of the counter-rotating plate with the sixth camera and oriented to record at least 180 degrees of the circumferential surface of the dosage.

* * * * *